Patented Jan. 1, 1946

2,392,135

UNITED STATES PATENT OFFICE 2,392,135

COATING MATERIAL

Henry O. Farr, Jr., Pittsburgh, Pa., assignor to Pittsburgh Plate Glass Company, Allegheny County, Pa., a corporation of Pennsylvania No Drawing. Application September 7, 1940, Serial No. 355,819

3 Claims. (Cl. 260—32)

The present invention relates to compositions of plastic material suitable for coating and other purposes, and it has particular relation to a composition comprising a film-forming plastic dispersed in a non-solvent, liquid medium.

An object of the invention is to provide a fluid composition suitable for use as a coating medium, or for similar purposes, which is relatively inexpensive, which does not present a fire hazard, and which, although it contains a relatively high amount of solids, is still of relatively low viscosity.

This and other objects of the invention will be apparent from consideration of the following specification and the appended claims.

One form of coating material commonly employed in the application of protective and decorative films to surfaces comprises as its main constituent a pigmented or unpigmented composition of an unsaturated glyceride oil, such as linseed oil, tung oil or the like. The oil is adapted upon application as a film to a surface, to oxidize and perhaps undergo other chemical changes to provide relatively impermeable and weather-resistant films. These compositions require considerable time to dry and possess other objectionable features.

A second form of coating composition includes a plastic material such as shellac, nitrocellulose or an artificial resin, such as an alkyd resin dissolved in a volatile solvent which is designed upon application of the material as a thin film to evaporate, thus leaving the plastic content as a permanent film upon the surface to which it is applied. Such compositions may also include pigments, coloring matter, plasticizers and other modifiers well known to those conversant with the art. Conventionally this latter type of coating composition includes an organic solvent such as ethyl acetate or the like material, which usually is expensive to obtain. Also, in many cases, vapors liberated therefrom during the drying process present hazards to health or are characterized by strong and disagreeable odors, which are highly objectionable to tenants of the buildings to which the compositions may be applied. Furthermore, the vapors may be relatively inflammable and thus present a distinct fire hazard.

The present invention contemplates the provision of a coating composition which can be used in lieu of the conventional materials and which includes a plastic preferably of thermoplastic nature suspended as a finely-divided or pulverulent solid in water or an aqueous medium.

Plastics which are contemplated include among others the copolymer of vinyl acetate and vinyl chloride, vinyl acetal resins, such as obtained by incomplete polymerization of vinyl alcohol in the presence of an aldehyde, such as butylaldehyde, propylaldehyde, etc. These acetal resins may conveniently be of the type employed as interlayers in safety glass. Still other plastics contemplated by the invention include acrylate resins, such as methyl methacrylate, ethyl methacrylate, propyl methacrylate, butyl methacrylate and the like, as well as fusible phenolic resins obtained by reaction and polymerization of phenol and formaldehyde or alkyd resins obtained by esterification of phthalic anhydride with glycerol and with or without free fatty acids as modifiers. The invention also contemplates cellulosic plastics of the nature of nitrocellulose, cellulose acetate, ethyl cellulose, benzyl cellulose and the like.

Various methods may be employed in the formation of the plastic material into a finely-divided powder, probably the simplest method being simple grinding or attrition. The latter method, however, is not always suitable, especially for the pulverization of relatively elastic or rubbery plastics. Other methods of forming the resins into powders are disclosed in British Patent 498,396, British Patent 481,532 and German Patent 670,212.

Another very convenient method of forming the powders involves the addition of water or other precipitating agent to a solution of the resin in a suitable solvent approximately to the point of incipient gelation of the resin in the solvent. Subsequently the solution is subjected to chilling and simultaneously to agitation to cause the resin to separate from the solvent in finely-divided form. The solvent may then be washed out with a non-solvent to obtain the powder in permanent form. Subsequently the non-solvent may be eliminated by evaporation or by filtration or by combination of the two methods and the powder incorporated with water and a water soluble plasticizer in accordance with the provisions of the present invention to provide the suspensions contemplated by the present invention. The following constitute examples illustrating the preparation of powder suitable for use in the practice of the invention:

*Example I*

About 150 parts of the resin obtained by partial condensation of polyvinyl alcohol with butyraldehyde was dissolved in 850 parts of synthetic methanol. To this solution under agitation at room temperature was added 90 parts of water. The resin was partially precipitated during this addition but redissolved upon continued agitation to form a clear fluid solution. The charge was continuously agitated and was gradually cooled. At 18° C. the charge became translucent and started gelling and at 5° C. the gel was quite heavy and viscous. Very strong agitation was required to keep the solution homogeneous at this point. At −3° C. some syneresis occurred and at −10° C. the gel began breaking and precipitation started. At −20° C. the resin had precipitated and the product was in fluid suspension. It was further cooled to −30° C. and an additional 2000 parts of water was added at this point to harden the resin. The mixture was poured into 3000 parts of water at room temperature and the product was isolated by filtration. It was dried in a current of air at 25° C. to yield a very light fluffy powder, 94.7% of which readily passed a 200 mesh sieve. Under the microscope the particle size appeared to be very uniform and in the neighborhood of 1000 mesh.

The filtered resin may be dried at any temperature below its softening point without serious coalescence of the resultant powder. A temperature of 45–50° C. has been found generally most satisfactory for polyvinyl acetal resins.

*Example II*

A solution was prepared by dissolving under agitation at room temperature, 100 parts of the resin obtained by copolymerizing 87 parts of vinyl chloride and 13 parts of vinyl acetate, in 900 parts of acetone. To this solution under agitation were added 320 parts of 88% isopropanol. Particles of resin precipitated during this addition but redissolved readily upon continued agitation. There resulted a slightly hazy but very fluid solution which was gradually cooled. At 5° C. the solution had become very hazy and quite viscous. At −4° C. the resin precipitated in very finely divided form to yield a fluid suspension. Cooling to −40° C. brought no further change in the appearance of the suspension.

An additional 700 parts of 88% isopropanol were added at −40° C. and immediately thereafter 1500 parts of water raising the temperature to −24° C. The charge was then dropped into 7000 parts of water at room temperature. After filtering and drying, less than 2% of the powder failed to pass a 200 mesh sieve.

*Example III*

Fifty parts of a commercial polymerized methacrylic resin known as "Acryloid BC–27" were dissolved in 450 parts of acetone. To this solution under agitation at room temperature were added 75 parts of water. The resulting clear solution was gradually cooled. At 9° C. it was viscous and haziness appeared. At 2° C. it was very hazy and viscous and required strong agitation to keep the mixture homogeneous. Between 0 and −5° C. the viscosity decreased very rapidly indicating that the gel had broken and the resin precipitated. At −8° C. an additional 500 parts of water were added after which the charge was dropped into 6000 parts of water at room temperature.

After mixing 1 hour the resin was filtered and was subsequently dried. It was then obtained as a fine powder the major portion of which readily passed a 200 mesh sieve.

*Example IV*

A sample of polyvinyl alcohol was prepared by the hydrolysis of low viscosity polyvinyl acetate by the method described by Blaikie and Crozier, J. Ind. and Eng. Chem. 28, 1158 (1936). According to this method fifty parts of the polyvinyl acetate known commercially as "Vinylite AYAA" were dissolved in 100 parts of synthetic methanol. A solution of 0.25 part of caustic potash in 10 parts of methanol was added. After several hours, the solution had set to a gel and after 18 hours a rubbery gel remained covered by a clear mixture of methyl acetate and methanol. The solvent was decanted and the gel was dissolved in water. The resulting solution was held at 90–100° C. until the residual methanol and methyl acetate had been distilled. Additional water was then added so that the final concentration corresponded to the addition of 330 parts of water.

To this solution under agitation was added 330 parts of acetone by volume. It was then chilled gradually to −10° C. where it gelled. At −20°, the gel started started synerizing and at −25° the gel was definitely broken and the product had precipitated. At −25 to −30° C. 1000 parts of acetone were added and the resulting suspension was allowed to warm to room temperature and was filtered. The filter cake was washed with 1000 parts of fresh acetone and was then dried in an oven at 65° C.

The product was thus obtained in dry lumps which were readily crushed under light pressure to a fine powder. All but 7% of the product readily passed a 200 mesh sieve.

*Example V*

Forty parts of a commercial resin obtained by polymerizing ethyl methacrylate were dissolved in a mixture consisting of 316 parts of 99.5% alcohol and 60% parts of acetone by volume. The solution was agitated at room temperature and there was added a solution consisting of 40 parts of water in 100 parts of alcohol. The solution became slightly cloudy but no precipitation occurred. It was then gradually cooled. At 15° C., the solution had become quite cloudy and at 12° C. it began to gel. At 10° C. the gel started to break and at 5° C. the gel had broken and there was a very fluid suspension. The charge was cooled to −15° C. and was there diluted with 140 parts of water. It was then poured into 2500 parts of water to form a fine suspension.

The suspension was filtered and the cake was washed with water. It was then dried in an oven at 50° C. to form soft lumps which broke readily into a fluffy powder. Essentially all of the powder passed a 200 mesh sieve.

*Example VI*

Eighty parts of the vinyl chloride-vinyl acetate copolymer known commercially as "Vinylite VYLF" was thoroughly mixed with 120 parts of isopropanol. The resulting mass was dissolved in 200 parts of acetone to form a fluid solution. The solution was gradually cooled to −35° C. at which temperature a slight gelling action was observed. Then under strong efficient agitation there was slowly added 40 parts of isopropanol. This was followed by 40 parts of 90% isopropanol, the addition of which resulted in completing the precipitation.

The resulting suspension was rapidly diluted with 2400 parts of water and the finely-divided resin was filtered and washed with additional amounts of water. After drying at 105° F. the dry resin was readily passed through a 200 mesh sieve.

*Example VII*

A solution was prepared by dissolving 80 parts of polymerized methyl methacrylate in 633 parts of acetone. The resin dissolved very slowly but yielded a clear homogeneous solution. There was then added at room temperature 214 parts of 50% (by volume) aqueous ethyl alcohol.

The hazy solution was then gradually cooled under continuous strong agitation. At 18° C. there was considerable gelling and some syneresis had occurred. At 13° C., the heavy gel started breaking and the solution started becoming thinner. At 6° C. it was quite fluid. It was rapidly cooled from this point to −15° C. and 270 parts of water were added at −15° C. to −10° C. The cold suspension was rapidly poured into an additional 4300 parts of water under agitation at room temperature.

After filtering and drying at 105° F., the resin was obtained in soft chunks which were readily broken into a powder easily passing a 200 mesh sieve.

*Example VIII*

An intimate mixture of 5 parts of vinyl chloride-vinyl acetate copolymer known commercially as "Vinylite VYHH" and 7.5 parts of titanium dioxide pigment was prepared by thorough mixing on a differential 2 roll mill. This mixture was introduced into 90 parts of acetone under agitation in a jacketed mixer. As soon as the suspension become homogeneous, there was added an additional 17.5 parts of "Vinylite VYHH."

The resin dissolved to form a rather viscous solution in which the pigment was homogeneously suspended. There was then added slowly and under good agitation 29.25 parts of 91% aqueous isopropanol.

The still fluid suspension was gradually cooled under strong agitation until at about 5°–0° C. During this time the suspension gradually thickened as the gel formed and then thinned as precipitation of the resin occurred. An additional 58.5 parts of 91% aqueous isopropanol were added and the cold suspension was then rapidly diluted in 650 parts of water.

After filtering and drying at 100° F. the resin-pigment mixture was obtained as a soft powder readily passing a 200 mesh sieve.

*Example IX*

One hundred forty parts of the resin obtained by condensing polyvinyl alcohol with butyraldehyde was dissolved to a clear solution in 1860 parts of methanol. The solution was cooled to −15° C. and water was added slowly under strong agitation. When 11 parts of water had been added, heavy gel was formed and after 12 parts, the gel began to break and shortly thereafter a very finely precipitated powder was formed. A total of 2600 parts of water was added at the low temperature, after which the suspension was poured into 18,000 parts of water at room temperature. The resin was filtered and was dried at 36° C. It was thus obtained as a fine powder, at least 97% of which readily passed a 100 mesh screen.

In the formation of a suspension of any of the foregoing powders, they may be simply admixed with water which preferably contains a water soluble plasticizer such as acetamide, acetin, urea, n-propyl carbonate, diphenyl urethane, phthalonic acid, trimethyl phosphate, ethyl metaphosphate, triethyl phosphate, diglycol diacetate, acetate of the ethyl ether of ethylene glycol, acetate of the ethyl ether of diethylene glycol and the like in an amount, for example, of 5 to 60% based on resin content. Dispersion may, if desired, be facilitated by the addition of a small amount of a dispersing and stabilizing ingredient, such as sodium oleate, Turkey red oil, Gardinol, or any other convenient wetting agent. The range of plastic material to water may vary from approximately 5% up to that at which the composition ceases to be sufficiently fluid for practical purposes. Probably the upper limit will be around 60 or 80 parts by weight of plastic for each 20 or 40 parts of water. Pigments, such as $TiO_2$, white lead, lithopone and others may be added in any desired ratio from substantially zero up to six or seven hundred per cent or even more based upon resin content. The following illustrate typical examples of compositions contemplated by the present invention:

*A primer surfacer*

|  | Grams |
|---|---|
| Powdered Vinylite H of copolymer of vinyl acetate and vinyl chloride | 6.3 |
| $TiO_2$ | 30.0 |
| Acetate of mono ethyl ether of ethylene glycol | 5.0 |
| Water | 22.5 |

Small amount of sodium oleate as a wetting and stabilizing agent.

*A clear coating*

|  | Grams |
|---|---|
| Vinylite H powder of copolymer of vinyl acetate and vinyl chloride | 10 |
| Ethyl metaphosphate | 4 |
| Water | 30 |

Few drops of Turkey red oil as wetting and stabilizing agent.

In the foregoing examples cellulose nitrate or other cellulosic plastic or any of the powders of plastics herein disclosed in the examples showing the preparation of resin powders may be substituted for Vinylite H.

The compositions may be applied to backings, such as paper, fabric, wood, glass, sheet steel or iron, such as "black iron," stone, asbestos board or any other material. Methods of coating include application by brush, spraying, roll coating, dipping and the like. The wet films may be dried by simply air drying or by baking in ovens, or in evacuated chambers. After drying is completed the films preferably are subjected to treatment in order to cause the particles of plasticized plastic to coalesce and to adhere to the surface to which they are applied. Such treatment may include exposure to a baking temperature, which may be any temperature sufficient to cause the particles to coalesce or weld, but insufficient to cause substantial decomposition of the film or the backing to which it is applied. The temperature of the range of about 200 to 400 degrees F., dependent upon the plastic, is usually to be preferred. Cohesion of the particles of plastic material upon the surface may also be effected by spraying the surface with a suitable solvent for the plastic or by exposing them to the action of solvent vapors in a closed chamber.

The addition of water suspensions of plastics to pulps of paper, followed by the formation of the pulp into sheets upon suitable paper-making apparatus is contemplated. The webs thus obtained may be dried and subjected to hot calendering or to the action of solvent vapors, in order to effect a welding together of the particles of resin entrapped in the pulp, thus forming an impregnated paper of high strength and water resistance.

A further application of the principles of the invention would involve dipping of cloth or other material into a bath of the plastic material in order partially or completely to impregnate it. Upon subsequent heating of the impregnated material the particles of plastic entrapped therein may be fused together. By this method it is possible to load or to stiffen or permanently size fabric, such as collar liners and other fabrics of like nature. Impregnation of fiber, glass, asbestos and other inorganic fibrous materials is also within the purview of the invention.

In order to form continuous sheets or films a polished steel band may be run through a bath of suspended powder and plasticizer or may be sprayed with such suspension. The water may then be evaporated and the resin fused to provide a continuous film that can be stripped off and used as a wrapping material.

A still further application of the invention involves partial or complete filling of porous molds with the suspensions. In such molds the water tends to permeate outwardly to leave the suspended resins as coherent coatings within the mold. Excess suspension may then be drained off and the films dried. Dipping of porous or permeable forms into suspensions of plastic material, in order to provide external coatings upon the forms would comprise a further variation of this form of the invention. The molds may be removed from the plastic bodies or may be permanently retained in place, if desired. As a subsequent operation the bodies may be subjected to heat or solvents in liquid or fiber form, in order to coalesce the particles and thus provide relatively homogeneous bodies.

In a further application of the invention the compositions may be admixed with 5 to 50%, based on resin content of a pigmentary body, such as carbon black, aluminum powder or the like, made up to desired consistency and used as a printing ink. These inks, when applied in a conventional printing process can be dried and fused with great speed, without any fire hazard traceable to the ink. In fact, the ink tends to reduce fire hazard.

The water suspensions of plastics of course involves no expensive solvents. It presents no hazard to health due to toxic solvents or suspending media and the water, of course, does not present a fire hazard. The suspensions are highly fluid and may contain very high ratios of solids and still retain their fluidity to such degree as to admit of convenient application by brushing, spraying, etc.

The forms of the invention herein disclosed are to be treated primarily as exemplary. It will be apparent to those skilled in the art that numerous modifications may be made therein without departure from the spirit of the invention or the scope of the appended claims.

What I claim is:

1. As a new composition of matter, a suspension of a non-cohering powder of copolymer of vinyl acetate and vinyl chloride of a particle size to pass a screen of about 200 mesh, in a medium comprising water containing in solution enough of a water-soluble organic plasticizer for the plastic to plasticize the latter when the water evaporates.

2. As a new composition of matter, a suspension of non-cohering powder of a copolymer of vinyl acetate and vinyl chloride, the powder being of a particle size to pass a screen of about 200 mesh, in water containing enough water-soluble plasticizer for the copolymer to plasticize it when the water evaporates, the water being in the ratio of approximately 3 to 1 upon the basis of resin content.

3. A composition of matter as defined in claim 2, in which the suspension further includes a pigment for the copolymer.

HENRY O. FARR, Jr.